United States Patent [19]

Rossi et al.

[11] Patent Number: 4,752,007
[45] Date of Patent: Jun. 21, 1988

[54] DISK SHIPPER

[75] Inventors: Alexander N. Rossi, Pleasanton, Calif.; Lynn Milbrett, Young America, Minn.

[73] Assignee: Fluoroware, Inc., Chaska, Minn.

[21] Appl. No.: 47,373

[22] Filed: May 6, 1987

Related U.S. Application Data

[63] Continuation-in-part of Ser. No. 937,680, Dec. 11, 1986, Pat. No. 4,718,552.

[51] Int. Cl.⁴ ............................................. B65D 85/57
[52] U.S. Cl. .................... 206/444; 206/334; 206/454; 206/508; 206/511; 206/515
[58] Field of Search ............... 206/508, 511, 515, 444, 206/334, 454

[56] References Cited

U.S. PATENT DOCUMENTS

| | | |
|---|---|---|
| 3,850,296 | 11/1974 | Hirata et al. |
| 4,043,451 | 8/1977 | Johnson. |
| 4,061,228 | 12/1977 | Johnson. |
| 4,450,960 | 5/1984 | Johnson. |
| 4,557,382 | 12/1985 | Johnson. |
| 4,588,086 | 5/1986 | Coe .................................... 206/444 |
| 4,721,207 | 1/1988 | Kikuchi ......................... 206/444 X |

Primary Examiner—William Price
Attorney, Agent, or Firm—Faegre & Benson

[57] ABSTRACT

A disk shipper is configured so as to allow the disk contents to be handled either by their internal diameter or by their external diameter. The bottom of the disk shipper is further configured so as to be compatible with certain existing disk carriers in transferring the disk contents to the particular disk carrier and vice versa. Since the particular disk carrier with which the bottom of the disk shipper is compatible prohibits external diameter handling, the novel disk shipper bottom facilitates transposing the disks into a configuration that permits both external and internal diameter handling. Supporting members inside the disk shipper maintain the disks in axial alignment preventing relative motion of the disks during handling.

14 Claims, 7 Drawing Sheets

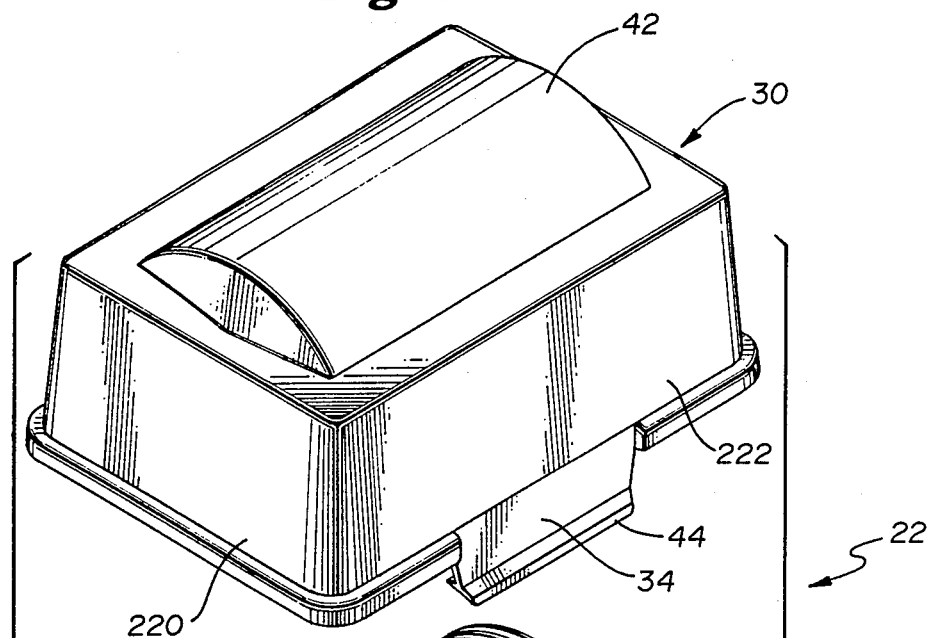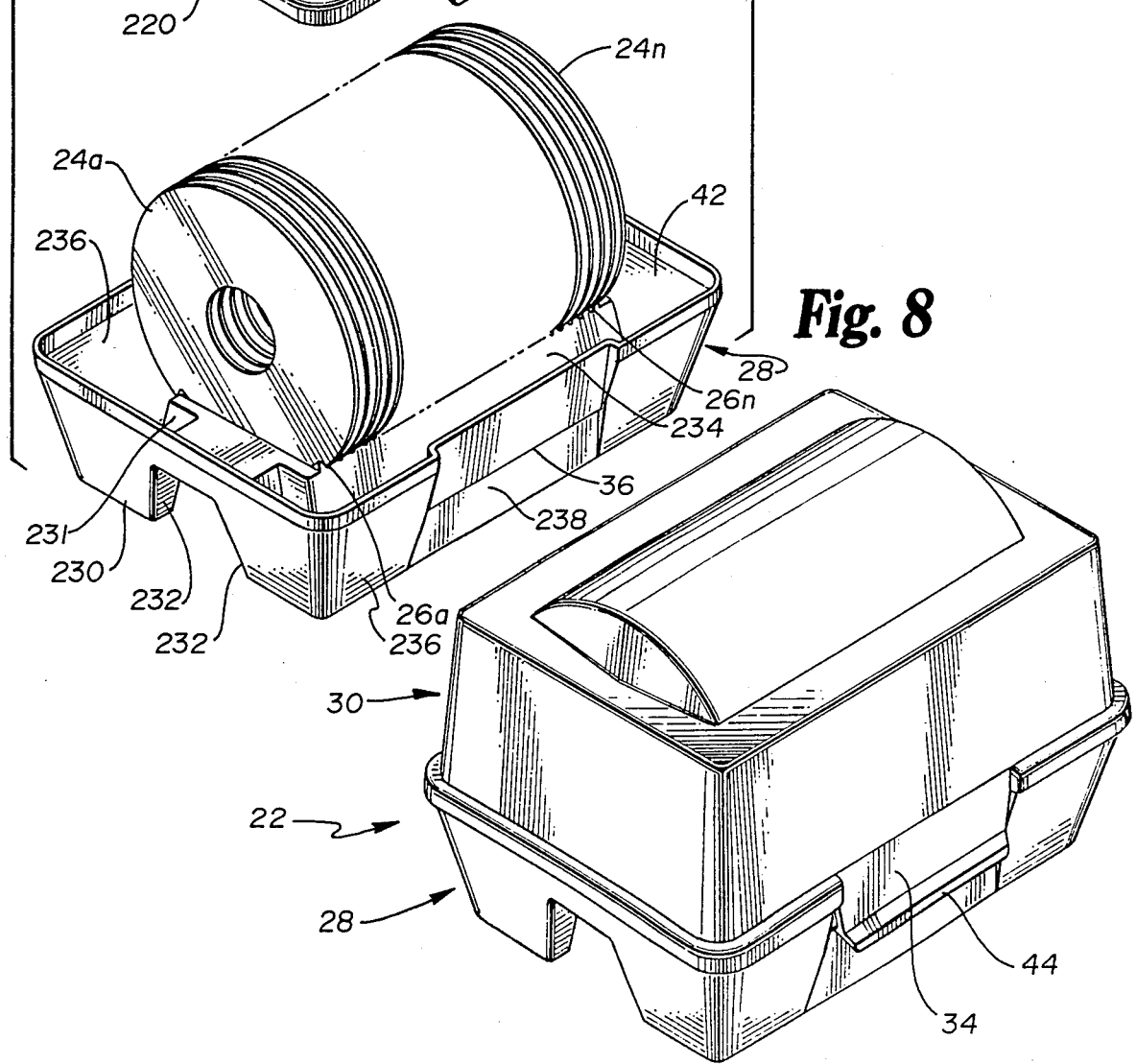

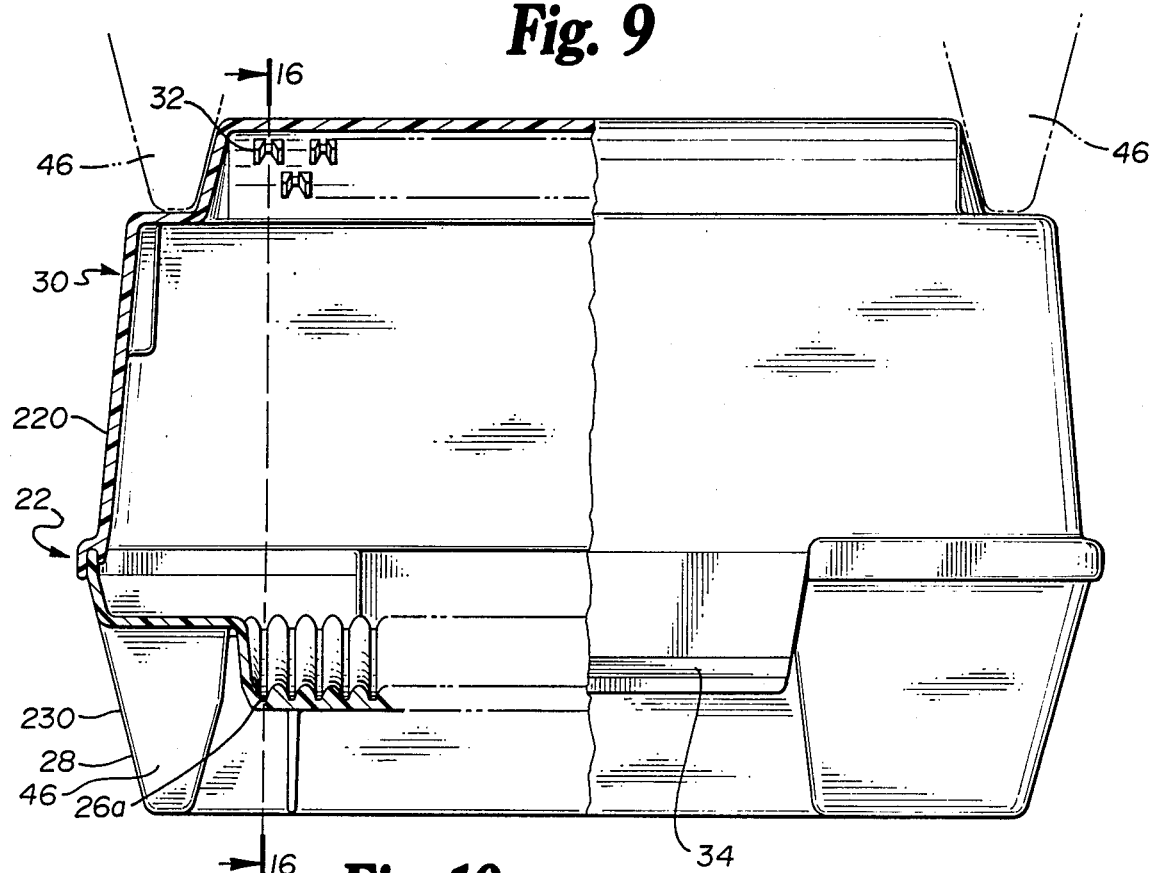
Fig. 9
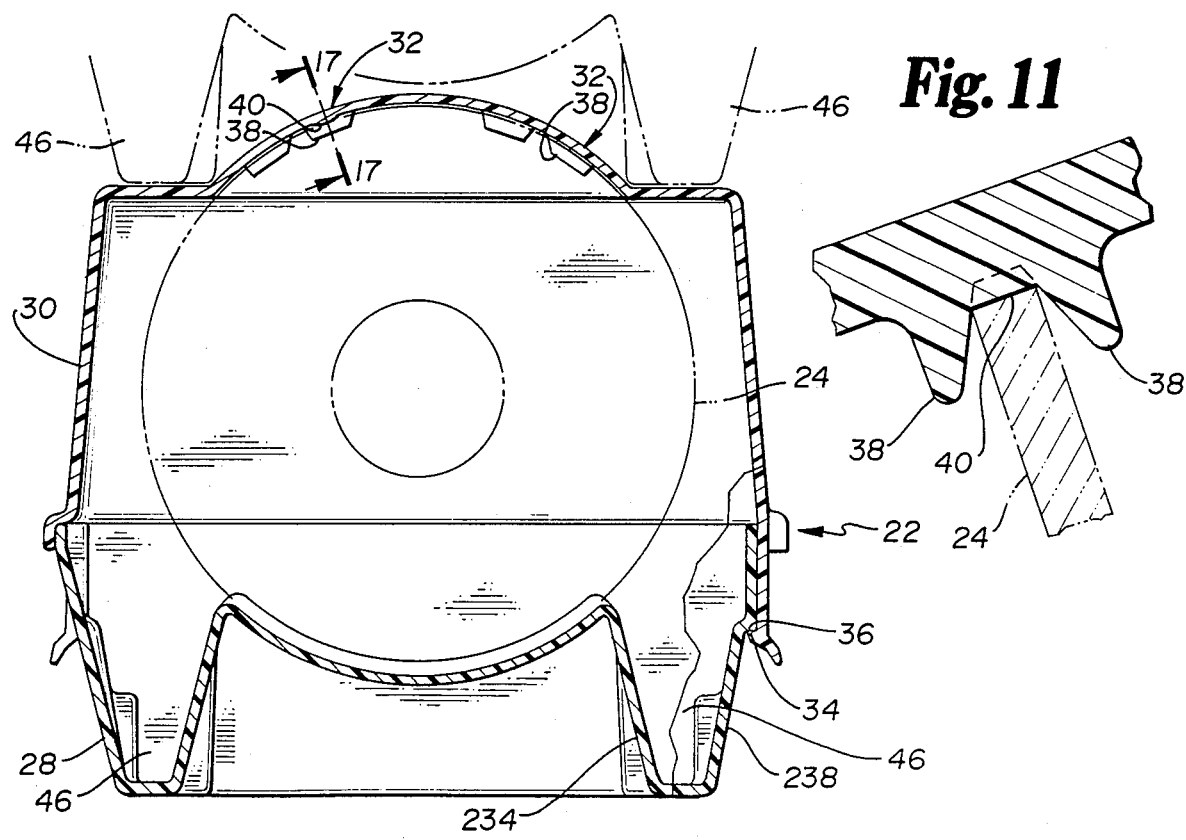
Fig. 10
Fig. 11

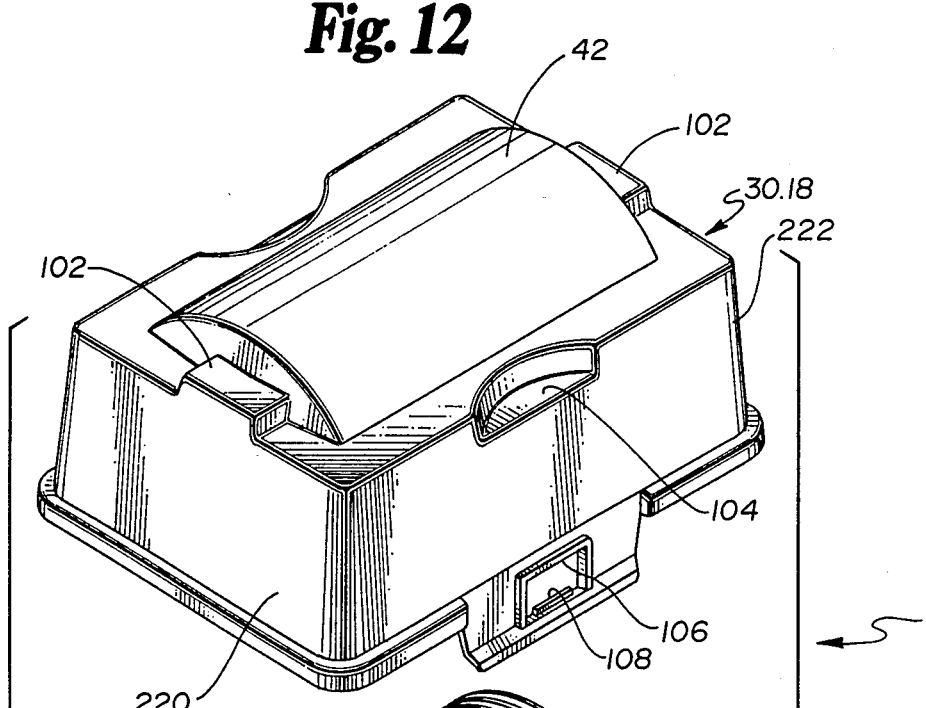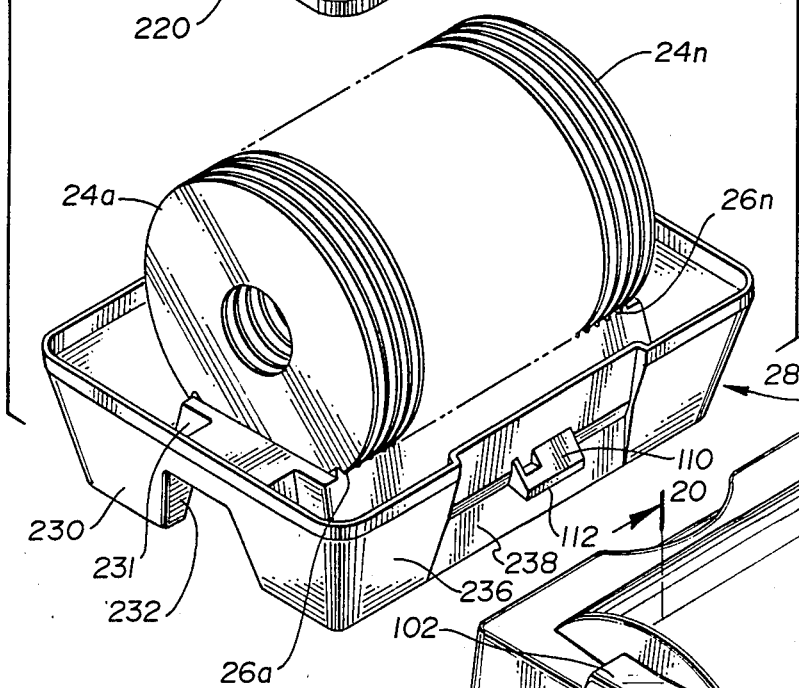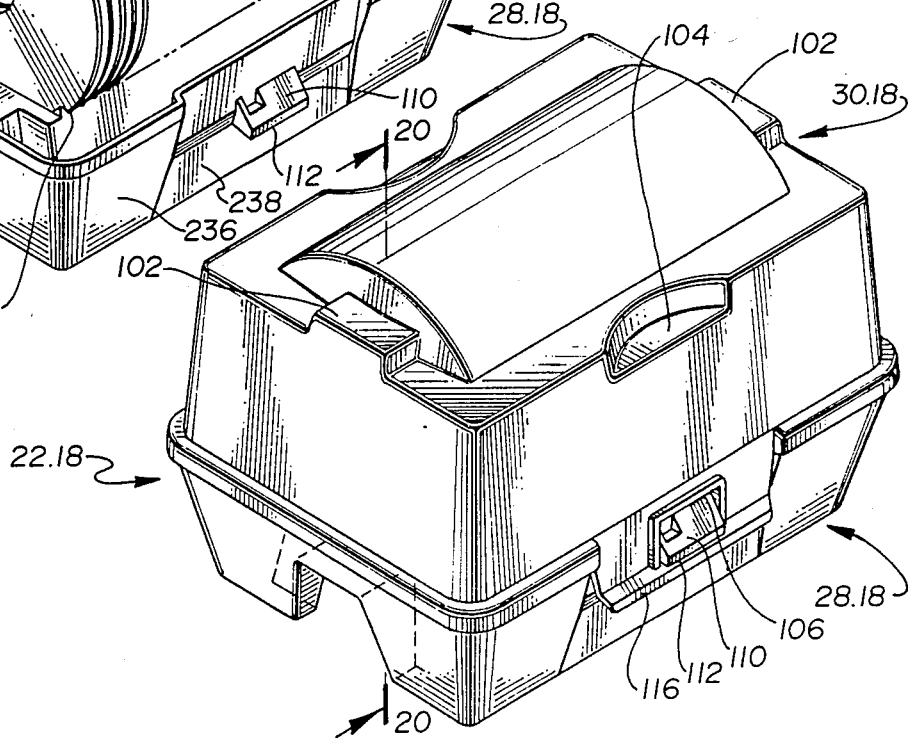

DISK SHIPPER

CROSS REFERENCE TO RELATED APPLICATION

This application is a continuation-in-part of Ser. No. 06/937,680, filed Dec. 11, 1986, now U.S. Pat. No. 4,718,552.

BACKGROUND OF THE INVENTION

1. Field of the Invention

The present invention provides a disk shipper of novel design to facilitate the handling and shipping of disks and disk like materials. More specifically, the present invention provides a disk shipper for the secure transportation and storage of relatively rigid information storage disks, with the disks held in the shipper bottom in an axial alignment accessible to either internal or external diameter handling. The bottom of the disk shipper of this invention is designed to allow the disks to be loaded into the shipper bottom from a compatibly designed existing disk carrier in a simple non-rolling transfer operation. The compatible designed existing disk carrier, with which the disk shipper of this invention is designed to be transfer compatible, by contrast only allows the disks to be handled by their internal diameter.

Most traditional information storage disk handling devices have generally been adapted to only internal diameter handling of the disks. Thus, the present novel designs are particularly useful with newly developed techniques for manual and automated disk placement and processing which utilize external diameter disk handling techniques.

Another unique feature of the present novel product is the ability to transfer disks from the disk shipper of this invention to a compatibly designed disk carrier or vice versa while maintaining the disks securely held throughout the transfer procedure so that undesirable rolling of the disks is avoided while the transfer procedure is smoothly and efficiently carried out. It has been noted that rolling of the disks in transfer operations, traditionally referred to as "dumping", is a source of damage to the disks by the generation of deleterious particulate. Since the disk carriers with which the present disk shipper are transfer compatible, do not allow for external diameter handling of the disks, this transfer procedure allows the disks to be transposed into an axial alignment permitting either internal diameter or external diameter handling.

The type of disks intended to be used with the disk shipper of this invention are relatively rigid information storage disks, such as optical disks, aluminum computer disks, compact disks and computer memory storage disks. Although, the design of the disk shipper and transfer tray of this invention may be able to be modified to be suitable for use with more fragile wafers, such as silicon wafers, they are primarily designed for use with more relatively rigid information storage disks.

2. Description of Related Art

Throughout the development of the information storage disk processing industry, handling and shipping product designs have had to keep pace with changes in the state-of-the-art of both manual and automated techniques. Current information storage disk processing procedures utilize handling of the disks by both internal and external diameter. Therefore, there is a great demand for disk handling and shipping products which will allow the disks to be easily handled by either their internal or external diameter and at the same time be compatible with previously available internal diameter access disk carriers to facilitate transfer thereto and vice versa.

The present invention fills a great unmet need in this art area by providing a disk shipper which not only provides a sturdy and convenient package for handling and transportation in a safe and secure manner, but also by providing a disk shipper which is designed to be compatible with existing internal diameter access disk carriers, so that the disks can be easily and safely transferred from the disk carrier to the shipper bottom or vice versa in a simple operation.

Currently available disk shipper designs which allow both internal and external disk handling are not transfer compatible with existing internal diameter access disk carriers. Empak, Inc. of Minnesota and Encore International of California both currently offer disk shippers which allow the disks to be accessed by either the internal or the external diameter, but which are not transfer compatible with existing disk carriers. Accordingly, the disks must be loaded by tedious and time consuming methods, which present the attendant problems of damage to the disks by particle generation, scratching or dropping.

In addition, many other deficiencies have been noted with previous disk shippers. Certain information storage disk shipping packages now available require three components to provide a secure package: a top, a bottom and a cassette insert. Thus, U.S. Pat. Nos. 4,557,382 and 4,450,960 require this type of arrangement, adding to the cost of materials involved, the storage space for the component parts and the time involved in assembling and disassembling the package.

Other disk shippers require separate cushioning inserts inside the top and bottom members to ensure alignment and positioning of the disks. U.S. Pat. Nos. 3,850,296; 4,043,451 and 4,061,228 all require some type of additional cushioning arrangement.

The present invention overcomes these and many other deficiencies noted in disk shipping and handling devices as will become apparent from the further consideration of the present disclosure.

SUMMARY OF THE INVENTION

The present invention is designed to provide a disk shipper which keep pace with recent developments in manual and automated procedures requiring the disks to be accessible for either internal or external handling and, at the same time, provides a disk shipper which is transfer compatible with existing disk carriers.

The disk shipper according to this invention consists of a shipper bottom and a shipper cover which mates with the bottom in latching attachment. The shipper bottom includes a generally rectangular floor member having a disk nest elevated above the floor member. The disk nest comprises a plurality of arcuate disk engaging and supporting grooves curved to the peripheral contour of the disks to engage and support the disks in upright parallel spaced-apart axial alignment. The four sides of the shipper bottom are angled upwardly and slightly outwardly from the floor member. A female trough inside the four sides substantially surrounds the disk nest. There are latching ledges on opposite sides of the shipper bottom for latching engagement with latch hooks on the shipper cover. Cover positioning members extend vertically upwards from the sides of the shipper bottom. The disk nest and the sides of the shipper bottom are configured so that the disks are accessible to internal diameter handling and to external diameter handling substantially below the horizontal centerline of the disk.

The shipper cover includes a generally rectangular top member having a plurality of arcuate disk locating elements in cooperating alignment with the arcuate disk supporting grooves in the shipper bottom to maintain the disks in upright parallel spaced-apart axial alignment, four sides angled downwardly and slightly outwardly from the top member, latching hooks on opposite sides in cooperating alignment with the latching ledges on the shipper bottom, and bottom positioning members extending vertically downwards from the sides in cooperating alignment with the cover positioning members on the shipper bottom.

As an alternative embodiment, the shipper cover includes a generally rectangular top member having a plurality of arcuate disk locating elements in cooperating alignment with the arcuate disk supporting grooves in the shipper bottom to maintain the disks in upright parallel spaced-apart axial alignment, a parallel pair of rows of downwardly extending toothed flanges, positioned one row on either side of the plurality of arcuate disk locating elements, said parallel pairs of rows being in cooperating alignment with the arcuate disk supporting grooves in the shipper bottom for maintaining the disks in upright parallel spaced-apart axial alignment and for stabilizing the disks against relative transverse or lateral movement inside the disk shipper, four sides angled downwardly and slightly outwardly from the top member, latching hooks on opposite sides in cooperating alignment with the latching ledges on the shipper bottom, and bottom positioning members extending downwards from the sides in cooperating alignment with the cover positioning members on the shipper bottom.

The disk shipper of this invention allows the disks to be handled manually or through automation by either the internal diameter or the external diameter in removing them from or inserting them into the shipper bottom.

Another unique feature of the disk shipper of this invention is the ability to transfer the disks from the shipper bottom to an existing compatibly designed internal diameter access disk carrier and vice versa in a manual operation without rolling of the disks as has been described in our co-pending application Ser. No. 06/937,680, now U.S. Pat. No. 4,718,552.

The existing internal diameter access disk carriers with which the shipper bottom of the present disk shipper is designed to be transfer compatible are described in our co-pending application Ser. No. 937,680. Also, the manner of transferring disks from the present shipper bottom to these existing disk carriers and vice versa has also been described in our co-pending application Ser. No. 937,680.

The present disk shipper also offers a unique shock absorbing cushioning effect provided by the shape of the area where the disks are supported in the shipper bottom and the shipper cover to prohibit transverse and lateral movement of the disks and to prevent scratching or damaging of the disks during handling. The parallel pair of rows of toothed flanges described above, operate in conjunction with the other disk positioning and supporting members in the disk shipper to further stabilize the disks against relative movement inside the disk shipper during shipping and handling. The disk shipper has a smooth exterior that permits a heat shrinkable plastic package to be formed around the shipping container if desired and purged with an inert gas to provide additional structural integrity to the shipper and to provide additional protection against environmental contamination.

The assembled shipper packages are designed to be securely stackable with each other, the the shipper bottoms and covers are individually nestable for economy of space. Because the disk shipper is intended as a reusable container, the cover and bottom components are designed to allow for complete drainage of liquids when cleaned in standard equipment.

Since the disk shipper is intended to provide safe and secure packaging for transportation by common carrier, a package loaded with relatively rigid information storage disks is designed to withstand normal handling without causing the disks to be damaged and rendered unusable.

BRIEF DESCRIPTION OF THE DRAWINGS

The many advantages of the devices of this invention will be readily appreciated by those of skill in this art by reference to the following detailed description when considered in connection with the accompanying drawings, in which like reference numbers refer to like parts throughout.

FIG. 7 is an exploded pictorial view of a disk shipper showing the shipper bottom with the shipper cover suspended thereover preparatory to being lowered into a latching position.

FIG. 8 is a pictorial view of the assembly of the shipper bottom and shipper cover into a disk shipper pack.

FIG. 9 is a side elevational view of a disk shipper pack with parts cutaway showing the grooves in the shipper bottom below and the cooperatively aligned locating elements in the shipper cover above.

FIG. 10 is a sectional view taken along line 16—16 of FIG. 9.

FIG. 11 is a greatly enlarged auxiliary cross sectional view taken along line 17—17 of FIG. 10, with a portion of a disk shown in phantom line.

FIG. 12 is an exploded pictorial view of an alternate form of shipper bottom and alternate form of shipper cover, with the shipper cover suspended over the shipper bottom preparatory to being lowered into a latching position.

FIG. 13 is a pictorial view of the closed and latched alternate form of shipper pack of the form shown in FIG. 12.

DETAILED DESCRIPTION OF THE INVENTION

Figure 1:
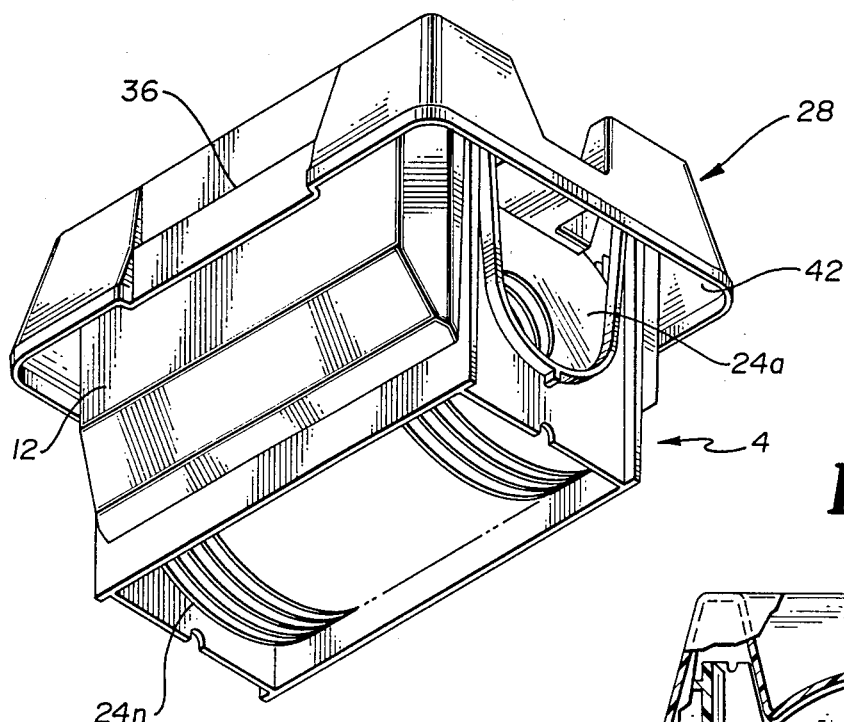
FIG. 1 is a pictorial view of a shipper bottom and disk carrier in cooperative assembly.
Figure 2:
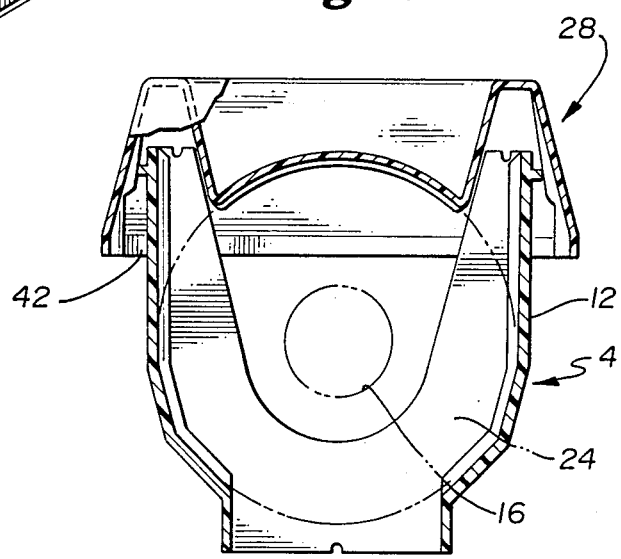
FIG. 2 is an end elevational view of the disk carrier-shipper bottom in the orientation shown in FIG. 1.
Figure 3:
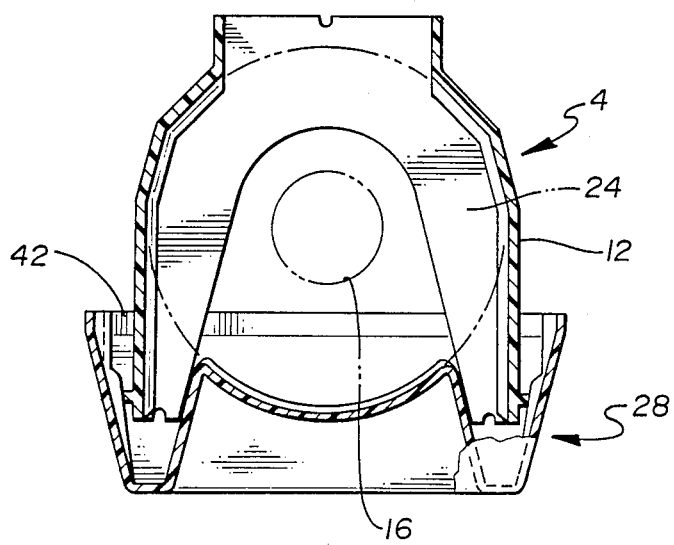
FIG. 3 is a view similar to that of FIG. 2 showing the assembly inverted therefrom.

FIG. 7 illustrates the disk shipper 22 of the present invention containing a plurality of disks 24a-24n resting in upright parallel spaced-apart axial alignment within respective grooves 26a-26n in the shipper bottom 28. When the disks are resting in these grooves, the disks are supported thereby in spaced-apart parallel alignment. Also shown in FIG. 7, the shipper cover 30 is suspended over the shipper bottom 28 preparatory to being lowered into a latching engagement with the shipper bottom 28, the shipper cover 30 having disk locating elements 32a-32n in cooperating alignment with the grooves 26a-26n in the shipper bottom 28. FIG. 7 also illustrates one of the advantageous features of the disk shipper of the present invention. With the shipper cover 30 removed, the shipper bottom 28 allows access to the external diameter of the disks 24a-24n, substantially below the horizontal centerline of the disk. Thus, the design of this disk shipper is compatible with both internal diameter and external diameter handling of the disks 24a-24n. FIG. 12, similarly to FIG. 7, and FIG. 13, similarly to FIG. 8, illustrates a disk shipper 22.18 of the present invention with the shipper cover 30.18 and the shipper bottom 28.18.

The disk shipper assembly 22 is shown with the shipper cover 30 in latched engagement with the shipper bottom 28 in FIG. 8. In latching the shipper cover 30 to the shipper bottom 28, the latch ledge 36 is firmly engaged by the latch hook 34. A side elevational view of the disk shipper pack is illustrated in FIG. 9 with parts cut away shows the grooves 26a-26n in the shipper bottom 28 below and the disk locating elements 32a-32n in the shipper cover 30 above, configured so that the grooves 26a-26n cooperate with the disk locating elements 32a-32n to maintain the disks 24a-24n in upright parallel spaced-apart alignment. The design of the disk locating elements 32a-32n facilitates secure engagement of the disks 24a-24n in cooperation with the grooves 26a-26n in the shipper bottom 28. The disk locating elements 32a-32n are molded into the top of the shipper cover and each disk locating element 32a-32n is formed of a parallel pair of rails 38 with a molded contact pad 40 positioned therebetween. The shipper bottom 28 is formed of a rigid material while the shipper cover is formed of a resilient flexible material, so that the cooperation of the grooves 26a-26n and the disk locating elements 32a-32n provides a secure cushioning for the disks 24a-24n, respectively. When the disk shipper assembly 22 is latched, the disks 24a-24n are thus firmly and safely held in place preventing transverse or lateral motion. FIG. 13, similarly to FIG. 8, shows the shipper cover 30.18 in latched engagement with the shipper bottom 28.18. In latching the shipper cover 30.18 to the shipper bottom 28.18, the latch window 106 and detent tooth 108 engage the corresponding striker 110 and latch catch 112. The disk shipper 22.18 contains the same grooves and the same disk locating elements as in the disk shipper 22.

Figure 15:
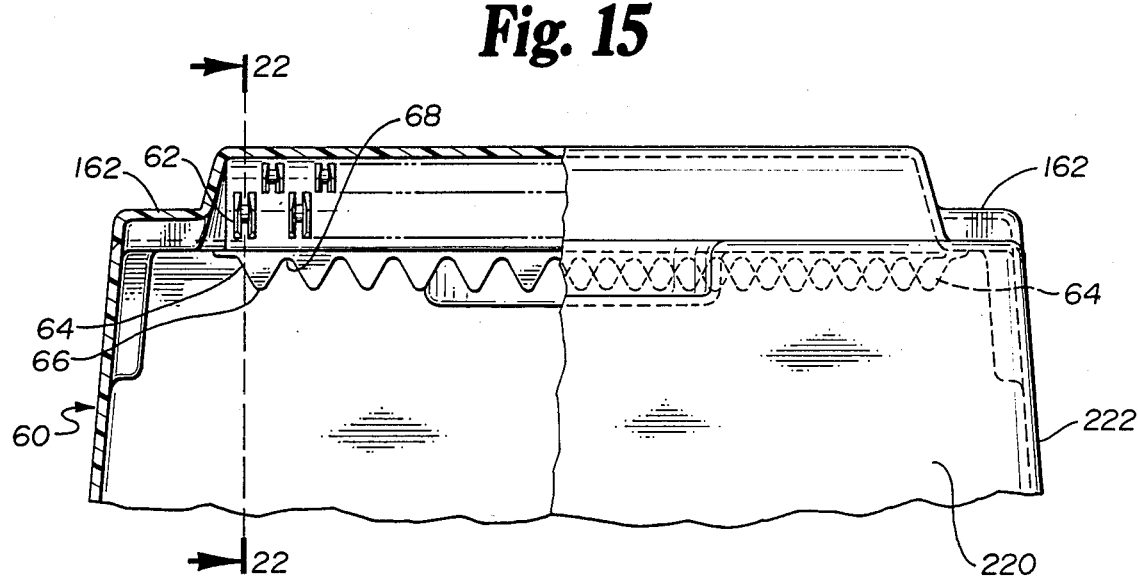
FIG. 15 is a fragmentary side elevational view of another alternative embodiment of the disk shipper cover with parts cut away showing the aligned disk locating elements and the parallel pair of rows of downwardly extending toothed flanges.
Figure 16:
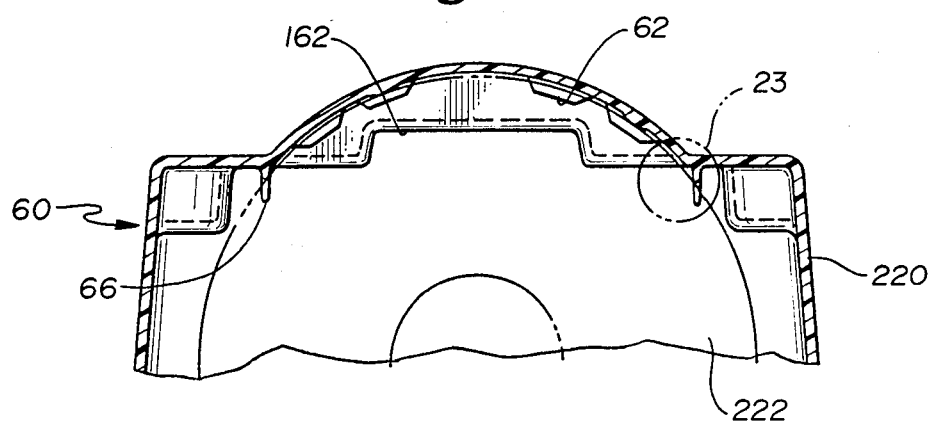
FIG. 16 is a sectional view taken along line 22—22 of FIG. 15.
Figure 17:
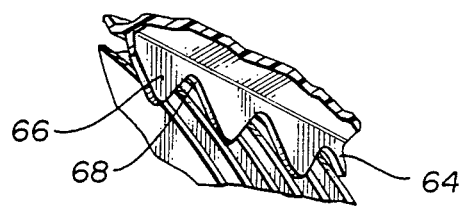
FIG. 17 is an explosive view taken inside circle 23 of FIG. 16.

FIG. 15 shows a fragmentary view of the shipper cover 60, with parts cut away to show the disk locating elements 62a-62n which are the same disk locating elements as in the shipper covers 30 and 30.18. In addition to these disk locating elements, shipper cover 60 is provided with a parallel pair of rows 62a-66n, positioned one row on either side of the plurality of arcuate disk locating elements 62a-62n. The parallel rows 64a-64b are in cooperating alignment with the arcuate disk supporting grooves in shipper bottoms 28 and 28.18 for maintaining the disks in upright parallel spaced-apart relative transverse or lateral movement inside the disk shipper. The downwardly extending toothed flanges 66a-66n in each row 64a-64b are separated from each other by concave cusps 68a-68n. FIGS. 16 and 17 show that opposite edges of each downwardly extending toothed flange 66 contact the adjacent edges of two adjacent disks and that two adjacent disks fit in each concave cusp 68 such that each disk is contacted by an edge of a flange, as the disks are supported by the disk locating elements and the disk supporting grooves in the disk shipper. The rows 64a-64b of flanges 66a-66n are molded into the top of the shipper cover 60. Shipper cover 60 can be formed with latch hook 34 and unlatching channel 44 for latching and unlatching, respectively, with shipper bottom 28, as shown in FIGS. 7 and 8. Shipper cover 60 can also be formed with latch window 106 and pull 116 for latching and unlatching with shipper bottom 28.18, as shown in FIGS. 12 and 13.

Figure 4:
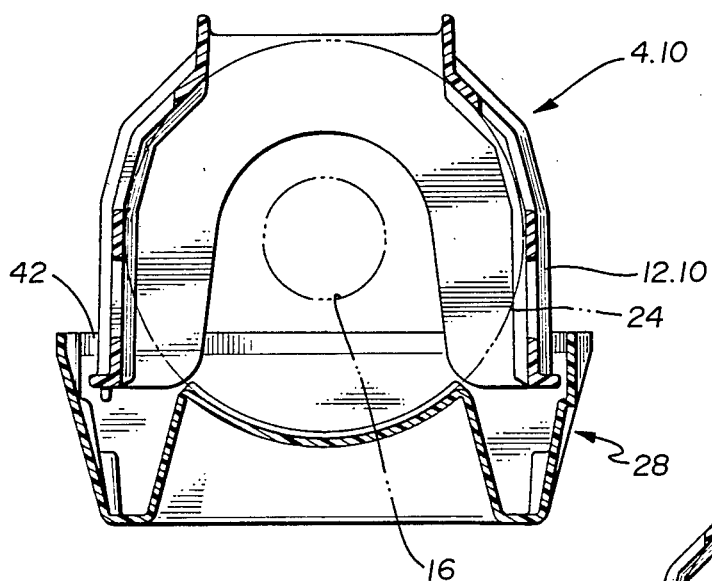
FIG. 4 is a view similar to that of FIG. 3 showing an alternate carrier means.
Figure 5:
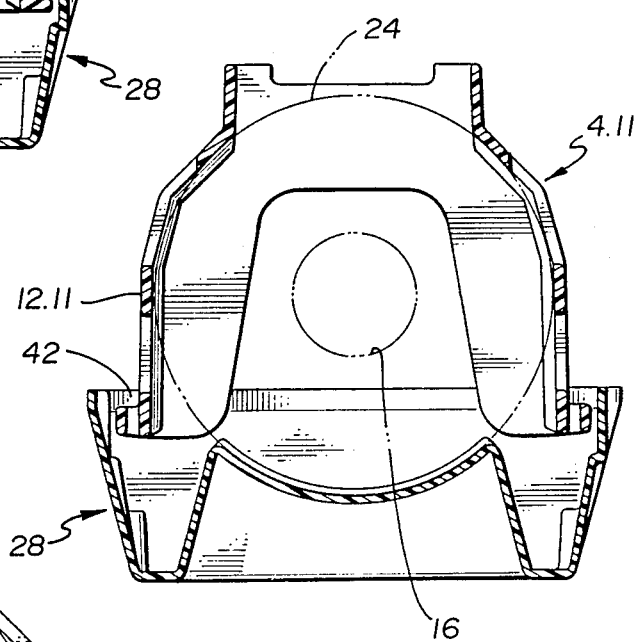
FIG. 5 is a view similar to that of FIG. 3 showing another alternate carrier means.
Figure 6:
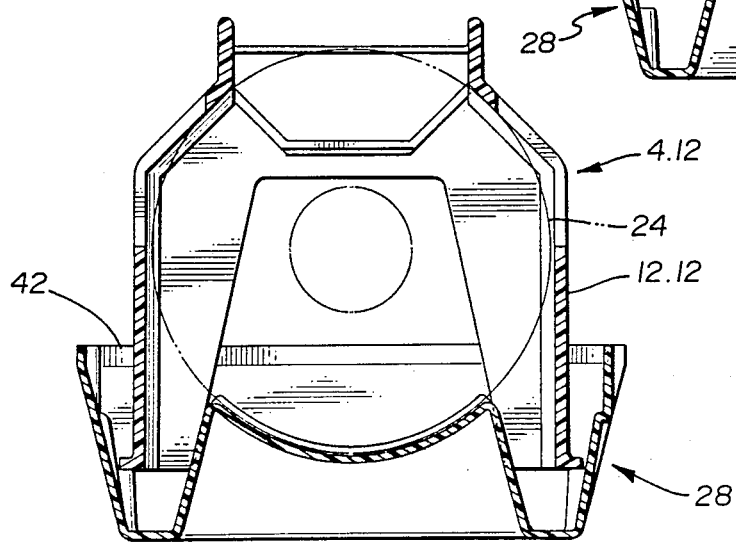
FIG. 6 is a view similar to that of FIG. 3 showing still another alternate carrier means.

In operation, a plurality of disks 24a-24n are loaded into the shipper bottom, with the grooves 26a-26n supporting the disks 24a-24n in upright parallel spaced-apart axial alignment. The loading operation may be performed by any manual or automated procedure. Advantageously, the shipper bottom is designed to accept non-rolling transfer of disks from a compatibly designed disk carrier, as defined herein above. Various transfer compatible disk carriers 4, 4.10, 4.11 and 4.12 are illustrated in FIGS. 3, 4, 5 and 6, respectively, in assembly with the shipper bottom 28 of the disk shipper of this invention. Note that the compatibly designed disk carriers allow access to the disks only by their internal diameter. The female trough 42 inside the four sides and substantially surrounding the disk nest is designed to accommodate the sides 12 of a compatibly designed disk carrier 4. Similarly, as shown in FIGS. 4, 5 and 6, the sides 12.10, 12.11 and 12.12, respectively, of the disk carriers 4.10, 4.11 nd 4.12, respectively, are designed to be accommodated by the trough 42 of the shipper bottom 28. The disk carriers shown as 4, 4.10, 4.11 and 4.12 are also transfer compatible with shipper bottom 28.18.

The manual non-rolling transfer of the disks from a compatibly designed disk carrier to the shipper bottom is accomplished as described in co-pending application Ser. No. 06/937,680.

To latch the shipper cover 30 to the shipper bottom 28, the cover 30 is lowered into position over the bottom 28 so that the disk locating elements 32a-32n in the cover 30 engage the disks 24a-24n held by the shipper bottom 28. The shipper cover 30 is firmly but gently pressed down over the shipper bottom 28 until each latch hook 34 firmly engages each corresponding latch ledge 36, as illustrated in FIGS. 7 and 8. When using the disk shipper 22.18, illustrated in FIGS. 12 and 13, the latching of the shipper cover 30.18 to the shipper bottom 28.28 is similar, with the latch window 106 and detent tooth 108 engaging the corresponding striker 110 and latch catch 112. When using the shipper cover 60, as illustrated in FIGS. 15, 16 and 17, the latching of the shipper cover 60 to the shipper bottom 28 and 28.18 is also similar. The latching arrangement for shipper cover 60 can be the same as described for shipper cover 30 or 30.18. The disk shipper now firmly and securely holds the disks without the possibility of transverse or lateral motion, suitable for transport. Removal of the shipper cover 30 is accomplished by upward and outward pressure on each unlatching channel 44. Removal of the shipper cover 30.18 from the shipper bottom 28.18 is similarly accomplished by using the thumb indentation 104 and exerting upward and outward pressure on the corresponding pull 116. The removal of the shipper cover 60 from the shipper bottom 28 or 28.18 is accomplished is a similar manner, depending on whether the shipper cover 60 is provided with the latching arrangement as shown in FIGS. 7 and 8 or as shown in FIGS. 12 and 13. The disk shipper has a smooth exterior that permits a heat shrinkable plastic package to be formed around the shipping container if desired and purged with an inert gas to provide additional structural integrity to the shipper and additional protection against environmental contamination.

Figure 14:
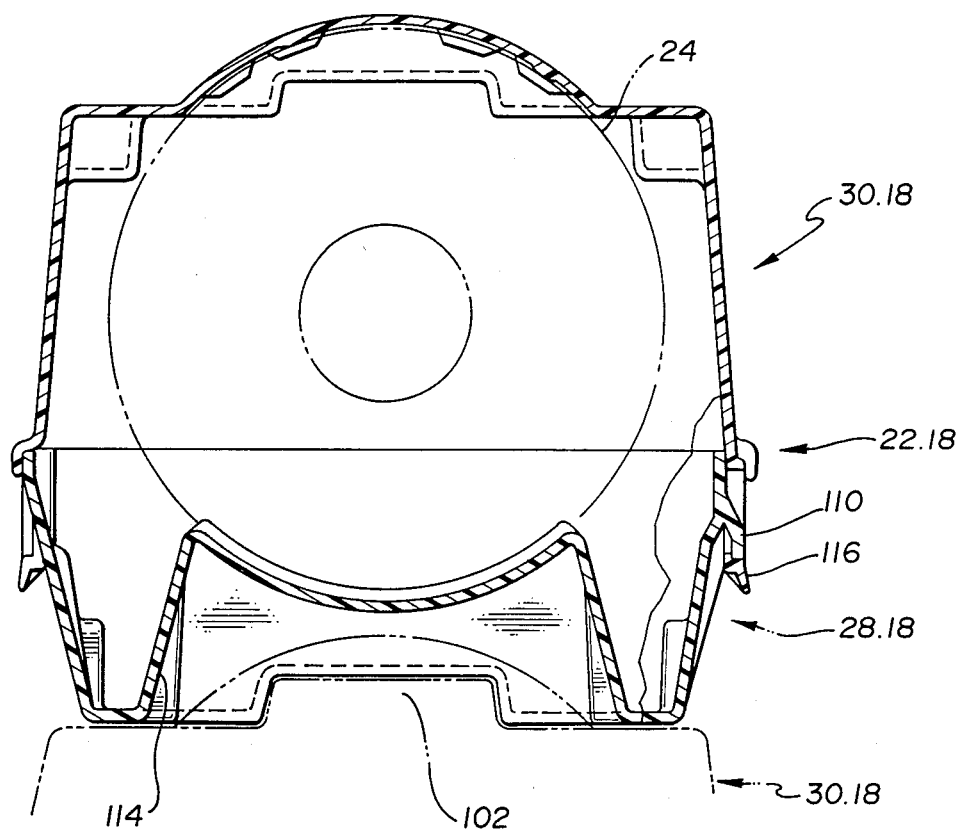
FIG. 14 is a section taken along line 20—20 in FIG. 13.

The assembled shipper packages are designed to be securely stackable with each other. As illustrated in FIGS. 15 and 16, the base sockets 46 of the shipper bottom 28, shown in solid and in phantom line to indicate the stacking configuration, nest over and around the longitudinal arch-shaped protrusion 42 on the top member of the cover 30. As illustrated in FIG. 14, the stacking blister 102 provides additional stacking alignment for the shipper packages 22.18. As illustrated in FIGS. 15 and 16, shipper cover 60 is similarly provided with a stacking blister 162 to provide additional stacking alignment for like shipper packages.

Additionally, the shipper bottoms and covers are individually nestable for economy of space. Referring to FIGS. 7, 12 and 15, generally upstanding walls 220 and 222 respectively are sufficiently sloped at normal draft angle or greater to permit an unused plurality of shipper covers to be stacked in a space saving manner. Similarly, referring to FIGS. 7 and 12, generally upstanding walls 230, 231, 232, 234, 236 and 238 respectively are sufficiently sloped at normal draft angle or greater to permit an unused plurality of shipper bottoms to be stacked in a space saving manner.

The shipper bottom may be formed of a rigid material capable of securely holding and accurately locating the disks. A suitable material has been found to be ABS synthetic resin optionally containing an anti-static protective additive. The shipper cover may be formed of a flexible resilient material capable of cooperating with the rigid shipper bottom to securely hold, accurately locate and resiliently cushion the disks. A suitable material has been found to be polypropylene synthetic resin optionally containing an anti-static protective additive.

The disk shipper of this invention can be formed to accommodate any size diameter and thickness of disks. To facilitate the non-rolling transfer of the disks from a compatibly designed disk carrier, the grooves 26a-26n of the shipper bottom must be configured to cooperatively align with the disks held by the disk carrier. Similarly, the shipper can be formed to accommodate any number of disks, again bearing in mind that the shipper must be sized to accommodate the capacity of the disk carrier from which the disks are to be transferred. Typical capacities of disk shippers are designed to accommodate up to 25, up to 30 or up to 50 disks.

What is claimed is:

1. A disk shipper containing:

a shipper bottom including a generally rectangular floor member having a disk nest elevated above the floor member, the disk nest comprising a plurality of arcuate disk engaging and supporting grooves curved to the peripheral contour of the disks to engage and support the disks in upright parallel spaced-apart axial alignment, the disks optimally containing a central hole concentric with the circumference of the disk, four sides angled upwardly and slightly outwardly from the floor member, a female trough inside the four sides substantially surrounding the disk nest, latching receiving means on opposite sides of the shipper bottom, cover positioning members extending vertically upwards from the sides of the shipper bottom, the disk nest and the sides of the shipper bottom configured so that the disks are accessible to internal diameter handling of disks having a central hole and to external diameter handling substantially below the horizontal centerline of the disks;

a shipper cover including a generally rectangular top member having a plurality of arcuate disk locating elements in cooperating alignment with the arcuate disk supporting grooves in the shipper bottom for maintaining the disks in upright parallel spaced-apart axial alignment, a parallel pair of rows of downwardly extending toothed flanges, said rows positioned with one row on either side of the plurality of disk locating elements, said rows of flanges being in cooperating alignment with the disk supporting grooves in the shipper bottom for maintaining the disks in upright parallel spaced-apart axial alignment and for stabilizing the disks against relative transverse or lateral movement inside the disk shipper, four sides angled downwardly and slightly outwardly from the top member, latching engaging means on opposite sides of the shipper cover for latching attachment with the latching receiving means on the shipper bottom, and bottom positioning members extending vertically downwards from the sides of the shipping cover in cooperating alignment with the cover positioning members on the shipper bottom; and the shipper bottom is transfer compatible with a disk carrier, the disk carrier having opposed side walls for carrying a plurality of axially aligned disks therebetween, an open top through which disks may be inserted and ejected, end walls joining the side walls, a bottom having disk support surfaces engaging and supporting the disks in upright parallel spaced-apart axial alignment, the disk support surfaces of the disk carrier and the disk supporting grooves of the shipper bottom having the same radius of curvature, maintaining the same axial disk spacing between the plurality of disks, and having the same total disk capacity, the side walls of the disk carrier configured so as to be able to fit into the trough of the shipper bottom, allowing the plurality of disks to be engaged and supported by both the disk support surfaces of the disk carrier and by the disk supporting grooves of the shipper bottom simultaneously, so that the disks can be transferred from the shipper bottom to the disk carrier and from the disk carrier to the shipper bottom in a non-rolling transfer.

2. A disk shipper according to claim 1 wherein:
on the shipper cover, the downwardly extending toothed flanges in each row are separated from each other by concave cusps, opposite edges of each flange contact the facing edges of two adjacent disks and two adjacent disks fit in each concave cusp such that every disk is contacted by the edge of a flange as the disks are supported by the disk locating elements and the disk supporting grooves in the disk shipper.

3. A disk shipper according to claim 1 wherein:
on the shipper cover, the plurality of arcuate disk locating elements define a longitudinal arch shaped protrusion on the exterior of the top member;
on the shipper bottom, the female trough defines base sockets on the exterior of the bottom member; and
the base sockets nest over and around the longitudinal arch shaped protrusion for stacking of like packages.

4. A disk shipper according to claim 1 wherein shipper covers of like packages are nestable when empty and shipper bottoms of like packages are nestable when empty.

5. A disk shipper according to claim 3 wherein the shipper bottom is formed of a rigid plastic and the shipper cover is formed of a flexible resilient plastic and the package has a capacity of up to 25 disks.

6. A disk shipper according to claim 5 wherein the shipper bottom is formed of ABS synthetic resin optionally containing an anti-static protective additive and the shipper cover is formed of polypropylene synthetic resin optionally containing an anti-static protective additive.

7. A disk shipper according to claim 6 wherein the arcuate disk locating elements in the shipper cover each are formed of a parallel pair of rails with a molded contact pad positioned therebetween to provide a secure cushioning for the disks.

8. A disk shipper according to claim 1, wherein the latching receiving means of the shipper bottom comprises a latch ledge and the latching engaging means on the shipper cover comprises a latch hook.

9. A disk shipper according to claim 1, wherein the latching receiving means on the shipper bottom comprises a latch window with a detent tooth, the latching engaging means on the shipper cover comprises a striker and latch catch, and the shipper cover has thumb indentations to facilitate latching and unlatching.

10. A disk shipper according to claim 1, wherein the disk nest and the side walls of the shipper obscure no more than 30% of the total area of the disks.

11. A disk shipper according to claim 1, wherein the disk shipper has a smooth exterior for enclosing the disk shipper in shrink wrap.

12. A package for disks and disk like materials including a package cover and a package bottom, wherein the package bottom is transfer compatible with a carrier for disks and disk like materials, comprising:
a package bottom having a floor member and supporting a plurality of disks, the disks optimally containing a central hole concentric with the circumference of the disk in spaced axial alignment therein in a disk nest elevated above the floor member, a female receiving trough substantially surrounding the disk nest, the trough and the disk nest configured so that the disks and disk like materials are accessible to handling by both their internal diameter of disks having a central hole and by their external diameter substantially below their horizontal centerline, and latch receiving means on opposing ends of the package bottom;
a package cover for enclosing the package bottom and the plurality of disks or disk like materials in spaced axial relationship therein, disk locating elements and disk stabilizing flanges on the inside of the cover for cooperating in maintaining the disks in spaced axial alignment and preventing relative transverse and lateral motion of the disks, and latch engaging means on opposing ends of the package cover for latching with the latch receiving means on the package bottom; and
the carrier for disks and disk like materials having a housing for supporting a plurality of disks or disk like materials in spaced axial alignment therein, an open top for inserting and ejecting disks and disk like materials therethrough, the package bottom and the carrier supporting disks and disk like materials of the same radius of curvature, the same axial spacing and the same capacity, the side walls of the carrier configured so as to be able to fit into the trough of the package bottom, allowing the plurality of disks or disk like materials to be engaged and supported by both the package bottom and the carrier simultaneously, so that the disks or disk like materials can be transferred from the package bottom to the carrier or from the carrier to the package bottom in a non-rolling transfer.

13. A package according to claim 12, wherein the exterior of the package cover and the exterior of the package bottom have means for stacking of like packages.

14. A package according to claim 12, wherein package covers of like packages are nestable when empty and package bottoms of like packages are nestable when empty.

* * * * *